(12) United States Patent
Ivanov et al.

(10) Patent No.: US 10,542,386 B2
(45) Date of Patent: Jan. 21, 2020

(54) HORIZONTAL POSITION ESTIMATE BASED ON INTERFLOOR CONNECTORS

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjärinne, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/448,765

(22) Filed: Mar. 3, 2017

(65) Prior Publication Data
US 2018/0255434 A1 Sep. 6, 2018

(51) Int. Cl.
H04W 4/00 (2018.01)
H04W 4/04 (2009.01)
H04W 4/02 (2018.01)

(52) U.S. Cl.
CPC .......... *H04W 4/043* (2013.01); *H04W 4/027* (2013.01)

(58) Field of Classification Search
None
See application file for complete search history.

(56) References Cited

U.S. PATENT DOCUMENTS

| | | | |
|---|---|---|---|
| 6,603,977 B1 * | 8/2003 | Walsh | G01S 5/0009 455/456.1 |
| 8,712,686 B2 | 4/2014 | Bandyopadhyay et al. | |
| 2005/0197139 A1 * | 9/2005 | Misikangas | G01S 5/0252 455/456.1 |
| 2009/0043504 A1 * | 2/2009 | Bandyopadhyay | G01C 17/38 701/469 |
| 2010/0250134 A1 | 9/2010 | Bornstein et al. | |
| 2011/0200023 A1 * | 8/2011 | Murray | G01S 5/02 370/338 |
| 2013/0116966 A1 | 5/2013 | D'Jesus Bencci et al. | |
| 2014/0073363 A1 * | 3/2014 | Tidd | G01S 5/0242 455/456.5 |

(Continued)

OTHER PUBLICATIONS

Hui Wang et al.: "Fusion of Barometric Sensors, WLAN Signals and Building Information for 3-D Indoor/campus Localization", http://isas.uka.de/Material/AltePublikationen/mfi_06wang.pdf, Apr. 13, 2006.

(Continued)

*Primary Examiner* — Mazda Sabouri
(74) *Attorney, Agent, or Firm* — Lempia Summerfield Katz LLC

(57) ABSTRACT

The disclosure inter alia relates to method, performed by at least one apparatus. The method includes obtaining information indicative of a use of an interfloor connector by a user of a mobile device; determining one or multiple potentially used interfloor connectors; and determining a horizontal position estimate of said mobile device at least based on one or multiple horizontal positions of said one or multiple determined potentially used interfloor connectors. The disclosure also relates to an apparatus including at least one processor and at least one memory including computer program code, the at least one memory and the computer program code configured to, with the at least one processor, cause an apparatus at least to perform the method.

20 Claims, 7 Drawing Sheets

(56) References Cited

U.S. PATENT DOCUMENTS

| | | |
|---|---|---|
| 2014/0243017 A1* | 8/2014 | Das .................. H04W 4/043 455/456.2 |
| 2015/0006100 A1 | 1/2015 | Jackson et al. |
| 2015/0169597 A1* | 6/2015 | Edge .................. G06F 17/3087 707/751 |
| 2015/0172872 A1 | 6/2015 | Alsehly et al. |
| 2015/0198443 A1 | 7/2015 | Yi et al. |
| 2015/0249907 A1* | 9/2015 | Gupta .................. H04W 4/043 455/456.1 |
| 2015/0264536 A1* | 9/2015 | Patil .................. H04W 4/029 455/456.1 |
| 2015/0281910 A1 | 10/2015 | Choudhury et al. |
| 2015/0341756 A1 | 11/2015 | Heshmati et al. |
| 2016/0091309 A1 | 3/2016 | Sasaki |
| 2016/0323439 A1* | 11/2016 | Tanabe .................. H04W 4/029 |

OTHER PUBLICATIONS

PCT International Search Report and Written Opinion of the International Searching Authority dated Jun. 12, 2018 for corresponding PCT/EP2018/055138.

* cited by examiner

HORIZONTAL POSITION ESTIMATE BASED ON INTERFLOOR CONNECTORS

FIELD OF THE DISCLOSURE

The disclosure relates to the field of positioning and more specifically to providing horizontal position estimates based on potentially used interfloor connectors.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth based positioning solutions, cellular network based positioning solutions and wireless local area network (WLAN) based positioning solutions.

As an example, a positioning solution based on WLAN (as an example of a communication network) may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths (RSS) and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

However, these indoor solutions require either deployment of totally new infrastructure (beacons, tags and so on) or manual exhaustive radio-surveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer mobile devices, such as smartphones.

Still, in particular during the above described training stage (e.g. during crowd-sourcing), one of the most difficult problems is the accuracy of the horizontal location estimation, since WLAN or Bluetooth based positioning may not yet be available in this stage. Generally, the only source of more-or-less accurate absolute location data remains GNSS, which is however not accurate enough, especially inside buildings or even close to them. Therefore, additional sources of horizontal location data independent of GNSS are needed in order to have reliable location data also indoors.

Often on-device tracking sensors, e.g. motion sensors, are used in addition to GNSS to improve location accuracy as well as to extend the availability of location information to the GNSS-denied areas such as indoor locations. Here, the problem arises, however, that this may still result in very inaccurate horizontal position estimates as the (motion) sensors only provide relative location data (i.e. the trajectory of the motion), and a GNSS signal is still required to get at least occasionally an estimation of an absolute position (a so called "position fix"). This is problematic, since a GNSS signal may not be available for longer periods of time, in particular indoors. An additional issue, which arises, may be that often in harsh environments position estimates based on GNSS are indicated with a low position uncertainty (i.e. good quality) although the actual position estimate has a high uncertainty (i.e. low quality). In an extreme case, for example, a GNSS position fix may be indicated to lie outdoors even though the user has already gone inside the building.

SUMMARY OF SOME EMBODIMENTS OF THE INVENTION

For an indoor positioning solution to be commercially successful, firstly it should be globally scalable, secondly it should have low maintenance and deployment costs, and thirdly it should offer an acceptable end-user experience. Different aspects of the disclosure may therefore take into account existing capabilities in the consumer devices. Further, different aspects of the disclosure may enable the use of the existing device capabilities in such a way that makes it possible to achieve a precise (e.g. 2-3 m) horizontal positioning accuracy. Moreover, different aspects of the disclosure may at the same time allow for quickly building the global coverage for this approach.

More specifically, different aspects of the disclosure may in particular allow for an improved horizontal positioning of mobile devices, in particular in addition to GNSS based position estimates, which may not be sufficiently accurate or which may be biased. This may in particular be the case for the training stage of an indoor position solution approach, where additional positioning information based on radio signals, such as WLAN or Bluetooth signals, may not yet be available. This may in particular be achieved without any additional hardware deployment at a respective site. Advantageously, certain aspects may have the effect that pressure measurements are utilized improve the horizontal position accuracy.

According to a first aspect of the disclosure, a method is described, performed by at least one apparatus, the method comprising:

obtaining information indicative of a use of an interfloor connector by a user of a mobile device;

determining one or multiple potentially used interfloor connectors;

determining a horizontal position estimate of the mobile device at least based on one or multiple horizontal positions of the one or multiple determined potentially used interfloor connectors.

The at least one apparatus performing the method may in particular be the mobile device or a part thereof. Examples of a mobile device are a smartphone, a tablet, a laptop, a wearable or a smart watch, for instance. The at least one apparatus may more generally be an apparatus according to the fourth aspect, as will be described in more detail below.

An interfloor connector may in particular be understood as a structure, construction, machine, and/or facility connecting at least two floors with each other. A floor may also be understood to be a level or a deck, for example. An interfloor connector may be powered or motor driven, e.g. electrically driven. An interfloor connector may in particular be arranged for an at least partially or exclusively vertical movement. An interfloor connector may in particular be designed for or allow an at least partially or exclusively vertical transportation of a user. Examples of an interfloor connector are a staircase, a stairway, a ladder, an escalator or an elevator, for example.

That the information is indicative of a use of an interfloor connector by a user is in particular understood to mean, that it can be derived from the information (preferably from the information alone) that the user is using or has used an interfloor connector. It may however be the case, that the use of an interfloor connector can only be determined with a certain probability.

The information indicative of a use of an interfloor connector may be obtained at the mobile device or at a remote server, for instance. The information indicative of a use of an interfloor connector may be determined by mobile device and/or another device. The information indicative of a use of an interfloor connector may take several forms. Preferably, the information indicative of a use of an interfloor connector may be based on or may be data of a sensor of the mobile device or on data of a sensor of a separate device in (wireless or wirebound) communication with the mobile device. For instance, the information indicative of a use of an interfloor connector may be obtained from a sensor susceptible to an at least partially vertical movement of the mobile device and thus of the user. In a preferred example, the information indicative of a use of an interfloor connector is or is based on sensor data of a pressure sensor, as will be explained in more detailed below. However, in other exemplary embodiments, it may also be possible that the information indicative of a use of an interfloor connector is or is based on a signal sent out by the interfloor connector, e.g. a radio signal, such as a WLAN signal, a Bluetooth signal or an RFID signal. The signal received at the mobile device or a remote server may be indicative of the user using a respective interfloor connector.

That one or multiple potentially used interfloor connectors are determined, may in particular be understood to mean that the one or multiple potentially used interfloor connectors are identified or marked as one or multiple potentially used interfloor connectors or selected from a group of available interfloor connectors. The determination, which interfloor connector is or was potentially used may vary in dependence of the information available. For instance, the determination of a potentially used interfloor connector may be based on the obtained information indicative of a use of an interfloor connector or on one or more previous and/or current horizontal position estimates as will be explained in more detail below. Even though the user normally only uses a specific interfloor connector at a time, the information on which the determination of the one or multiple potentially used interfloor connectors is based may be ambiguous. Additionally, multiple interfloor connectors may be located close to each other, so that an unambiguous determination may not be possible. Therefore, the determined interfloor connector is termed a potentially used interfloor connector, as it may be ambiguous, which interfloor connector is or has been used by the user.

In this regard, the method according to the first aspect may comprise checking, whether the obtained information is indicative of a use of an interfloor connector by a user of a mobile device. For instance, it may be checked whether the information is indicative of a sufficient and/or sufficiently fast change of a vertical position of the mobile device (and thus of the user), as will be explained in further detail below. In case of a positive result, i.e. if it is determined that the user has used an interfloor connector, the method may continue with the described determining of one ore multiple potentially used interfloor connectors.

The method may in particular be used to determining a horizontal position estimate at an indoor site, e.g. in a department store, shopping mall, airport, transit system, convention center, hotel, arena, stadium, and/or public building. Thus, the interfloor connector may in particular be an indoor interfloor connector of any of the aforementioned sites. The site may in particular be a site with no reception or with restricted or limited reception of GNSS systems.

A horizontal position estimate of the mobile device is in particular understood to represent or indicate a horizontal position of the mobile device (and thus of the user of the mobile device) on the surface of the earth. The horizontal position estimate may represent or indicate the horizontal position of the mobile device on a map. The horizontal position estimate may indicate only a part (e.g. with regard to one dimension) or the complete horizontal position of the mobile device. A horizontal position estimate may in particular be an absolute horizontal position estimate. An absolute horizontal position estimate may in particular represent or indicate a horizontal position independent of and/or not relative to other previous and/or current horizontal position estimates. Thus, the horizontal position estimate may in particular be considered an (absolute) position fix. In contrast, a relative position estimate may in particular depend on other previous and/or current horizontal position estimates. As an example, the horizontal position estimate may for instance comprise information representative of a latitude and/or longitude (e.g. latitude and/or longitude values). As another example, the horizontal position estimate may comprise information indicating a grid point of a grid representing a map pertaining to a geographical area (e.g. a site), at which the user is located.

That a horizontal position estimate is determined is understood to mean that the position estimate is at least representative of a horizontal position of the mobile device. Thus, it may also be the case that a position estimate is determined which comprises further information, e.g. which is additionally representative of a vertical position of the mobile device.

That the horizontal position estimate of the mobile device is at least based on the one or multiple horizontal positions is understood to mean that the horizontal position estimate may also be determined based on further information. For instance, the determination of the horizontal position estimate of the mobile device may additionally be based on a position estimate from another source (e.g. GNSS, a motion sensor, signals of a communication system or the like). However, the horizontal position estimate may also exclusively be based on the one or multiple horizontal positions. This may in particular be advantageous, where there is no additional positioning information based on radio signals, such as WLAN or Bluetooth signals, available (e.g. in a training stage of an indoor positioning solution approach).

In one example, it may be assumed that the horizontal position of the mobile device (and thus of the user) is the horizontal position of the interfloor connector closest to a previous or current position estimate of the mobile device. Thus, the closest interfloor connector may be determined as a potentially used interfloor connector. The horizontal position estimate of the mobile device may be determined to be the horizontal position of this closest interfloor connector. A closest position may be understood as a position with the shortest (Euclidian) distance to the respective reference position.

A determined interfloor connector may have or be associated with a single horizontal position. This may for example be sufficient in case of substantially exclusively vertically moving interfloor connectors such as elevators. Thus, in case of multiple interfloor connectors, each interfloor connector may be associated with a single horizontal position. However, a determined interfloor connector may also have or be associated with multiple horizontal positions. This may for example be advantageous in case of partly horizontally moving interfloor connectors such as escalators. In one example, an interfloor connector may be associated with multiple horizontal positions representing different access points (e.g. an entrance and an exit point) of the respective interfloor connector. Thus, at least a part of the one or multiple determined interfloor connectors may have or be associated with multiple horizontal positions.

The respective horizontal positions of the determined interfloor connectors may be available, e.g. stored in a memory, at an apparatus performing the method according to the first aspect. For instance, an apparatus performing the method, e.g. the mobile device, may obtain map data pertaining to a geographic area, such as a site, and which comprises respective horizontal positions of interfloor connectors in the geographic area. The map data may be obtained at an apparatus for certain geographic areas, such as a region, a city or a country. It may also be possible that map data is obtained specifically for a geographic area in which the user is located.

The approach of the disclosure can thus provide additional information about the horizontal position of a user of a mobile device, specifically in addition to GNSS, which may not be accurate and may be biased. Thus, the disclosed approach may be an additional enabler for crowd-sourcing methods.

Thus, the method according to the first aspect may in particular be a method for collecting fingerprints in a training stage of an indoor positioning solution approach (e.g. a crowd-sourcing approach). A fingerprint may contain a position estimate and measurements taken from the radio interface of the mobile device and preferably a transmitter ID of the sender. The position estimate for a fingerprint can in this case make use of the horizontal position estimate determined with the method according to the first aspect. Based on the collected fingerprints, a radio map may then be generated or updated.

In this regard, the method according to the first aspect may in particular additionally comprise one or more of the following:
  generating one or more fingerprints each comprising a position estimate of the mobile device and a result on a measurement on a radio signal, wherein said position estimate is at least based on a respective determined horizontal position estimate;
  generating or updating a radio map at least based on said one or more fingerprints.

A radio map may either explicitly indicate radio signal values or may comprise model data. A radio map may thus be generated by mapping the radio signal(s) (e.g. RSS value(s)) and, if available, the associated radio transmitter ID(s) of each fingerprint to a grid point that corresponds to a geographical position that is or is closest to the measurement position indicated in the fingerprint. If there are several radio signals for the same radio transmitter that would be mapped to the same grid point, some kind of average value may be used, for instance the arithmetic mean or the median value. For grid points to which no radio signals could be mapped due to missing fingerprints from the corresponding positions, radio signal values may be generated by interpolating surrounding radio signal values if possible, and by extrapolating neighboring radio signal values otherwise. Alternatively, the original or mapped radio signals could be used for estimating for each radio transmitter parameter values for a radio model (e.g. a path loss model), and the radio model could then be used for mapping all or missing radio signal values to grid points of the grid.

According to an exemplary embodiment of the different aspects, the information indicative of a use of an interfloor connector by the user of the mobile device is indicative of an at least partially vertical movement of the mobile device.

An at least partially vertical movement of the mobile device (and thus of the user) can be used as a reliable indicator for the use of an interfloor connector by the user of the mobile device. When a user goes from one floor to another, their altitude changes rapidly compared to when moving along the street or other outdoor areas. A partially vertical movement may for instance be a movement with a vertical but also a horizontal component. Such a movement may in particular arise for interfloor connectors such as staircases or escalators. In certain cases, the information may be indicative of a substantially exclusively vertical movement of the mobile device. Such a movement may in particular arise for interfloor connectors such as elevators. In any case, the information indicative of a use of an interfloor connector by the user of the mobile device may only be representative of the vertical movement of the mobile device.

Information indicative of an at least partially vertical movement is preferably pressure information, as will be described in further detail below. However, other types of information may also be used alone or in combination. For instance, it is also possible to use information from a motion tracking sensor, such as information of an acceleration sensor.

In this regard, the method may for instance comprise checking if the at least partially vertical movement of the mobile device indicated by the obtained information is above a threshold. For instance, it may be checked if the at least vertical movement indicates a height difference above a threshold (e.g. at least one floor height) and/or if the at least partially vertical movement is sufficiently fast. This allows for distinguishing between information indicative of a use of an interfloor connector by a user of a mobile device and information not indicative of a use of an interfloor connector by a user of a mobile device.

Information indicative of an at least partially vertical movement of the mobile device may for instance comprise information about a vertical position over time. A vertical position of the mobile device may for instance be an (absolute or relative) altitude, height or elevation of the device, e.g. an altitude, height or elevation above sea level or an altitude, height or elevation above ground or any other suitable reference level. For instance, in case the information is pressure information (as described below) and if the sea level pressure in the area or at the location of the mobile device is known, the altitude above sea level may be determined by comparing the known pressure at sea level with the pressure at the mobile device. The difference in the pressure may be converted in the altitude of the mobile device above sea level. As examples, the altitude (as an example of a vertical position) may be measured in units of length (such as meter, kilometer, feet etc.). As another example, the vertical position may also be or represent the floor level, for instance "ground floor", "first floor", "second floor", etc. For this, the floor height may need to be estimated or known.

More specifically, in order to determine a partially vertical movement of the mobile device, a (first) vertical position or pressure at the mobile device at a first time instance may be compared with a (second) pressure or vertical position at the mobile device at a second time instance. In case pressure information is used, it may be assumed, that the pressure at a certain altitude is stable for short temporal intervals (for example in the range of minutes, such as 10 minutes, for instance). The difference in the first and second pressure at the mobile device may then be converted in a change of the vertical position (i.e. a change of the altitude, height, elevation, floor level etc.) of the device between the first and second time instance. This may not only be done for single time instances, but the vertical movement of the mobile device may substantially continuously be tracked in this way.

According to another exemplary embodiment of the different aspects, the information indicative of a use of an interfloor connector by the user of the mobile device is pressure information representative of pressure at the mobile device.

Pressure information can advantageously indicate at least partially vertically movements of the mobile device as described above. The pressure at the mobile device is in particular understood to be an ambient pressure at the mobile device. The pressure may in particular be an atmospheric or barometric pressure. Atmospheric pressure is understood to be the pressure exerted by the weight of air in the atmosphere of earth. In most circumstances the atmospheric pressure is closely approximated by the hydrostatic pressure caused by the weight of air above the measurement point. However, in particular indoors, the ambient pressure may also deviate from the atmospheric pressure due to artificially created low or high ambient pressures. The pressure information may for instance be or comprise one or multiple ambient pressure values. The pressure information may for instance be or comprise one or multiple pressure measurements. The pressure information may for instance be obtained as or measure a pressure value in any suitable unit, such as Pascal (Pa), Bar (bar), Technical Atmosphere (at), Standard Atmosphere (atm), Torr (torr) or Pounds per square inch (psi), just to name a few examples. However, any proprietary units and scales may be used as well. Likewise, the pressure information may for instance also comprise or be composed of information derivable from a pressure or a measurement thereof. For instance, the pressure information may be information converted or transformed from a pressure into another quantity or value, which is still representative of the pressure. Generally, the pressure information may be or may be based on a single pressure measurement or may also be based on at least two pressure measurements.

That the pressure information is representative of a pressure at the mobile device may be understood to mean that the information is representative of a pressure close to, in the proximity of, around or in the mobile device, for example.

According to another exemplary embodiment of the different aspects, the pressure information representative of pressure at the mobile device is based on one or multiple pressure measurements by said mobile device.

In this regard, the method according to the first aspect may further comprise measuring, by the mobile device, a pressure for obtaining the pressure information. By measuring the pressure by the mobile device pressure information may be obtained in a simple manner. The measuring may be a direct or indirect measurement. For instance, an electronic pressure sensor may be used, which may measure a pressure based on optical, magnetic, capacitive, piezoelectric or other effects.

The measuring of the pressure may be performed by a pressure measurement instrument, such as a manometer or a barometer. This may have the effect that the pressure measurement can be employed easily at the mobile device in order to obtain the pressure information at the mobile device. For instance, the device performing the ambient pressure measurement may be integrated in the mobile device. For instance, the pressure measurement instrument may be an integral part of the mobile device. However, it may generally also possible that the pressure measurement is performed by a separate tag, e.g. a Bluetooth tag, with an integrated barometer.

The pressure information preferably comprises multiple pressure measurements over time. The pressure information may thus be representative of a pressure development over time. For instance, the pressure information may be continuously obtained (in particular measured) by the mobile device. In this regard, the method may for instance comprise checking if a change of a pressure at the mobile device is above a threshold. For instance, it may be checked if the pressure change indicates a pressure difference (and thus height difference) above a threshold (e.g. corresponding to at least one floor height) and/or if the change of pressure is sufficiently fast. In case of a positive result, i.e. if it is determined that the user has used an interfloor connector, the method may continue with the described determining of one ore multiple potentially used interfloor connectors.

According to another exemplary embodiment of the different aspects, the method further comprises:
  obtaining one or multiple previous and/or current horizontal position estimates of said mobile device.

The one or more previous and/or current horizontal position estimate may in particular be used for determining the one or multiple potentially used interfloor connectors. The one or multiple previous and/or current horizontal position estimates may also be corrected or updated based on the determined horizontal position estimate. The one or multiple previous and/or current horizontal position estimates may in particular be based on GNSS, one or more motion tracking sensors of the mobile device, a cellular network system, and/or a manual input. As explained, a GNSS signal may be inaccurate indoors, but can be used to determine the site, at which the user is located. A motion tracking sensor (such as an accelerometer, a gyroscope, a magnetometer, a barometer or any other sensor suitable for motion tracking) of the mobile device may also work indoors. However, the provided position information may be of low quality. A cellular network may also not be available in parts of buildings, e.g. in underground parts of a building. While it may also be possible that the one or multiple previous and/or current horizontal position estimates are alternatively or additionally based on one or more of a Wireless Local Area Network (WLAN) system, a Bluetooth (BT) system or a Radio Frequency Identification (RFID) system, this is often not possible for the training stage or while collecting fingerprints, at which stage these systems can generally not provide an absolute position fix.

A previous or current horizontal position estimate may be or comprise a single (final) previous or current position estimate of the mobile device. In case of multiple previous and/or current horizontal position estimates, the horizontal position estimates may be multiple horizontal intermittent position estimates for the same time (e.g. calculated by using a particle filter), which can then be used for the determination of a single (final) previous and/or current position estimate of the mobile device. A previous and/or current horizontal position estimate may also be determined by use of a Kalman filter.

According to another exemplary embodiment of the different aspects, multiple potentially used interfloor connectors are determined; wherein the determining of a horizontal position estimate of the mobile device is at least based on respective multiple horizontal positions of the multiple determined potentially used interfloor connectors. This is advantageous as it may be the case that it is ambiguous, which interfloor connector has been used by the user. It may also be the case, that a previous and/or current horizontal position estimate is very inaccurate so that, if the closest interfloor connector would be considered as the used interfloor connector, this could result in a potentially even more inaccurate horizontal position estimate. This undesired effect can be mitigated by determining multiple potentially used interfloor connectors and by basing the determination of the horizontal position of the mobile device on respective multiple horizontal positions of said multiple determined potentially used interfloor connectors.

For instance, a (maximum and/or predetermined) number of N interfloor connectors closest to one or multiple previous and/or current horizontal position estimates are determined as potentially used interfloor connectors. Additionally or alternatively, the interfloor connectors within a certain distance (e.g. within a certain radius) to one or more previous and/or current horizontal position estimates are determined as potentially used interfloor connectors. In order to determine the horizontal position estimate of the mobile device, the (e.g. weighted) mean or average of the horizontal positions of the determined interfloor connectors can be used as the horizontal position estimate of said mobile device. Also, the variance of the average or mean value may be determined and be used for an indicator of the quality of the horizontal position estimate of the mobile device.

According to another exemplary embodiment of the different aspects, the determining of a horizontal position estimate of the mobile device comprises averaging the one or multiple previous and/or current horizontal position estimates and the one or multiple horizontal positions of the one or multiple determined potentially used interfloor connectors.

In one example, a horizontal position estimate may be determined by calculating a (preferably weighted) average of a (single) previous or current horizontal position estimate and one or multiple horizontal positions of respective multiple interfloor connectors. The weights of the one or multiple horizontal positions of respective multiple interfloor connectors may be based on the (single) previous or current horizontal position estimate, e.g. on the respective distance to the (single) previous or current horizontal position estimate.

According to another exemplary embodiment of the different aspects, the one or multiple horizontal positions of the one or multiple determined potentially used interfloor connectors are weighted based on the one or multiple previous and/or current horizontal position estimates of the mobile device. Thus, the determining of the horizontal position estimate of the mobile device is at least based on respective weighted horizontal positions of the one or multiple determined potentially used interfloor connectors. For this, each horizontal position of an in interfloor connector may be associated with a respective weight. A respective weight may, for instance, be inversely proportional to the distance of the respective horizontal position of the interfloor connector to a (in case of multiple previous and/or current position estimates e.g. the closest) previous and/or current horizontal position estimate.

According to another exemplary embodiment of the different aspects, the determining of the one or multiple potentially used interfloor connectors is at least based on one or multiple previous and/or current horizontal position estimates of the mobile device. As already explained, the one interfloor connector or the multiple (e.g. a maximum and/or predetermined number N of) interfloor connectors closest to the one or multiple previous and/or current horizontal position estimates may be determined as the one or multiple potentially used interfloor connectors. As already explained, a previous and/or current horizontal position estimate may in particular be a single final previous and/or current position estimate, which may, however, be inaccurate, as it is based on a GNSS and/or motion tracking sensors of the mobile device. Multiple previous and/or current horizontal position estimates may in particular be intermittent previous and/or current position estimates (e.g. as used in a particle filter approach), which may, however, also be inaccurate.

According to another exemplary embodiment of the different aspects, the determining of the horizontal position estimate of the mobile device is further based on one or multiple previous and/or current horizontal position estimates of the mobile device. For instance, in case of multiple previous and/or current horizontal position estimates, the previous and/or current position estimates may be previous and/or current intermittent horizontal position estimates. These previous and/or current intermittent position estimates may be updated (e.g. modified regarding their position and/or their weight) based on the determined potentially used inter floor connectors. The updated previous and/or current intermittent horizontal position estimates may then be used to determine the horizontal position estimate of the mobile device.

Alternatively, the step of determining of the horizontal position estimate of the mobile device is independent from the one or multiple previous and/or current horizontal position estimates of the mobile device. This would be the case, for example, if the horizontal position estimate of the mobile device is assumed to be the horizontal position of a determined potentially used interfloor connector or the average of respective horizontal positions of multiple determined potentially used interfloor connectors. Nevertheless, the determining of the potentially used interfloor connectors may still be based on one or multiple previous and/or current horizontal position estimates of the mobile device, as described above.

According to another exemplary embodiment of the different aspects, the one or multiple previous and/or current horizontal position estimates of the mobile device are weighted based on the one or multiple horizontal positions of the one or multiple determined potentially used interfloor connectors. As described, this is in particular advantageous in case of multiple intermittent previous and/or current position estimates, as they are used in a particle filter approach. As the multiple intermittent previous and/or current position estimates may already be associated with a weight, the weighting may be considered as a reweighting of the multiple intermittent previous and/or current position estimates. For instance, the one or multiple previous and/or current horizontal position estimates of the mobile device may be (re)weighted based on their respective distance (e.g. inversely proportional) to the one or multiple horizontal positions of the one or multiple determined potentially used interfloor connectors.

According to another exemplary embodiment of the different aspects, the multiple previous and/or current horizontal position estimates of the mobile device are intermittent position estimates of the mobile device for the same time. An intermittent position estimate is in particular understood to be a potential position, which is used to determine a single final position estimate. As already mentioned, the multiple previous and/or current horizontal position estimates may be obtained during a particle filter approach. A particle filter is known as a prediction technique to improve the position estimation by using particles. This approach may exemplary comprise the following steps: First, S particles with representing different step distances and headings may be generated at a certain position estimate (e.g. a position fix from GNSS). The S particles may each have a weight of 1/S. Then, during movement of the mobile device, the particles are repositioned according to their corresponding step distance and heading, and their corresponding headings and step distances are updated according to estimated change in heading and pace. The particles are constantly reweighted in this process e.g. based on a distance to the current position estimate. Also new particles may be generated instead of the old ones. if the total sum of the weights drops below a threshold). In this case new particles can be a copies (with slight random deviations) of the old particles which have the highest weights. The final position may be obtained from the weighted average of all particles available at a certain time. The particles may be an example of multiple previous and/or current horizontal position estimates for the same time.

In other examples, additionally or alternatively a Kalman filter may be used for determining any of the described position estimates, e.g. the one or multiple previous and/or current horizontal position estimates of the mobile device.

According to another exemplary embodiment of the different aspects, the determining of one or multiple potentially used interfloor connectors is at least based on the obtained information indicative of a use of an interfloor connector by the user of said mobile device. More specifically, the information indicative of a use of an interfloor connector may allow for a determination, which interfloor connector has potentially been used, as the obtained information indicative of a use of an interfloor connector may comprise information about further details, such as a type of interfloor connector, a length of use, a height difference etc. Thus, the determining (e.g. identifying or selecting) of the one or multiple interfloor connectors potentially used by the user can be refined compared e.g. to an approach only relying on one or multiple previous and/or current horizontal position estimates.

According to another exemplary embodiment of the different aspects, the determining of one or multiple potentially used interfloor connector comprises determining a type of said interfloor connector used by said user of said mobile device at least based on said obtained information indicative of a use of an interfloor connector by said user of said mobile device. As an example, e.g. in case the obtained information indicative of a use of an interfloor connector by said user of said mobile device is indicative of an at least partially vertical movement (e.g. pressure information), the type of connector may be determined based on the amount and/or speed of an ascend and/or descend of the mobile device. For instance, interfloor connectors of others types may be ruled out as a potentially used interfloor connector.

According to another exemplary embodiment of the different aspects, the method further comprises:

determining a start of use and/or an end of use of the interfloor connector used by the user of the mobile device, wherein the horizontal position estimate of the mobile device is determined for a time corresponding to the start of use and/or the end of use.

The start of use and/or end of use of the interfloor connector used by the user of the mobile device may be determined based on the obtained information indicative of a use of an interfloor connector. The start of use may be an enter or access time of the user with respect to the interfloor connector, the end of use may be an exit time of the user with respect to the interfloor connector. This may in particular have the effect, that a high precision of a determination of the time(s), at which the mobile device and the user were located at the determined position, can be achieved.

According to another exemplary embodiment of the different aspects, the method further comprises:

updating a previous and/or current horizontal position estimate based on the determined horizontal position estimate of the mobile device.

It may be the case that a previous and/or current (final) horizontal position estimate is already available. As explained above, this may in particular be used for determining the one or multiple potentially used interfloor connectors. As the determined horizontal position estimate is expected to be of higher quality (e.g. position accuracy) than the previous and/or current (final) horizontal position estimate, the previous and/or current (final) horizontal position estimate can be updated or correct based on the previous and/or current location estimate. This may allow for eliminating inaccuracies of previous and/or current horizontal position estimates.

According to another exemplary embodiment of the different aspects the at least one apparatus comprises one of
said mobile device; or
a component of said mobile device; or
a server; or
a component of a server.

The method according to the first aspect may in particular be performed by only one of the above apparatuses but also together by e.g. the mobile device or a component of the mobile device and by a server (which may be in communication with the mobile device) or a component of a server. In any case, the mobile device may in particular be the apparatus configured for measuring pressure in order to obtain the described pressure information.

According to a second aspect of the disclosure, a computer program code is described, the computer program code when executed by a processor causing an apparatus to perform the actions of the method according to the first aspect.

According to a third aspect of the disclosure, a (e.g. non-transitory and/or tangible) computer readable storage medium is disclosed in which computer program code according to the second aspect is stored. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a fourth aspect of the disclosure, an apparatus is disclosed configured to realize or comprising respective means for realizing the method according to the first aspect. The means of such an apparatus can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

According to the fourth aspect of the disclosure, an apparatus comprising at least one processor and at least one memory including computer program code is also disclosed, the at least one memory and the computer program code configured to, with the at least one processor, cause an apparatus at least to perform the method according to the first aspect.

Any of the described apparatuses may comprise only the indicated components or one or more additional components. Any of the described apparatuses may be a module or a component for a device, for example a chip. Alternatively, any of the described apparatuses may be a device, for instance a server or a mobile device. Any of the described apparatuses may for instance at least comprise a user interface, a communication interface and/or an antenna.

The features and example embodiments of the disclosure described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a block diagram of a system 1 of a mobile device 2 and a server 3, which may both be exemplary embodiments of an apparatus according to the fourth aspect of the disclosure and which may separately or together perform exemplary embodiments of the method according to the first aspect of the disclosure. The details of mobile device 2 and server 3 are described with respect to FIG. 2, which is an exemplary block diagram of the mobile device 1 of FIG. 1, and FIG. 3, which is an exemplary block diagram of the server 3 of FIG. 1.

The mobile device 2 may be configured to determine position information in particular based on a Global Navigation Satellite System (GNSS), for example (not shown). However, in particular for indoor situations, there may be no reception of GNSS signals, the GNSS signals may be too weak in order to get reliable location information or the GNSS signals suggest a reliable position estimate in fact the quality is poor.

For instance, the mobile device 2 may be a part of or may be a cellular phone, a personal digital assistant, a laptop computer, a tablet computer, a wearable or a multimedia player. Server 3 may be a server located remote from mobile device 2, for instance. Server 3 may also comprise multiple devices and/or may be realized as a computer cloud, for instance.

Figure 2:
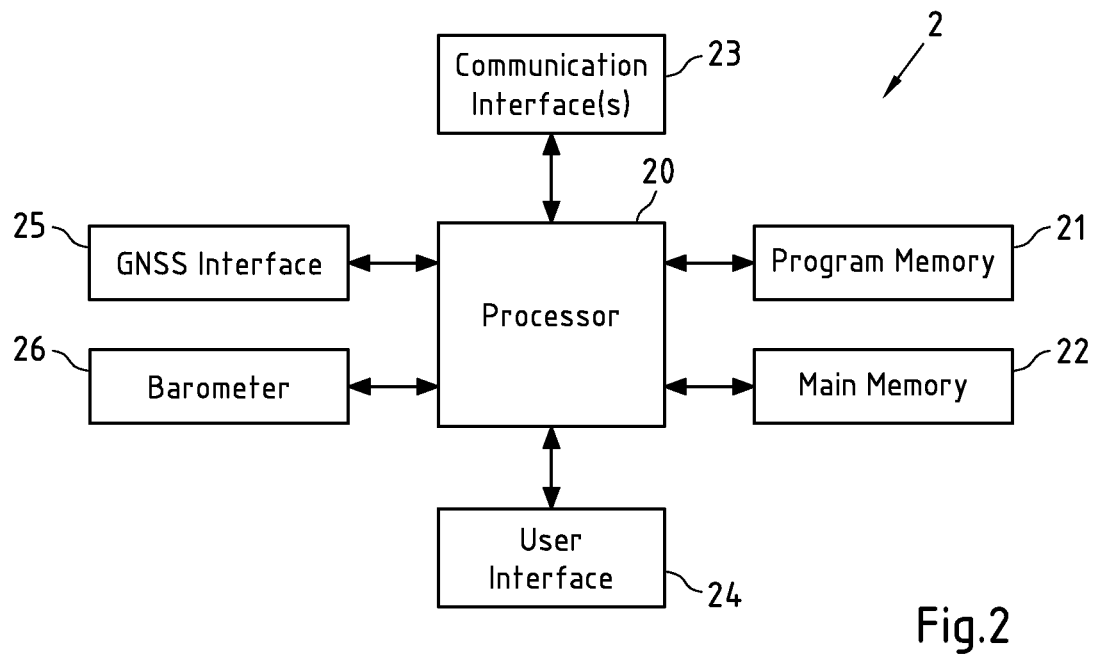
FIG. 2 is a block diagram of mobile device of FIG. 1.

Turning now to FIG. 2, mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform one or more of the embodiments of a method (or parts thereof) according to the first aspect of the disclosure (as for instance further described below with reference to FIG. 4), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from mobile device 2, for instance in the form of a removable SD memory card. One or more sets of position information, for instance in a database, that are useable by mobile device 2 to determine positions may for instance be stored in program memory 21. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a communication interface 23 configured to receive and/or output information. For instance, communication interface 23 may be configured to send and/or receive data to/from server 3. Mobile device 2 may further be configured to communicate with server 3 of system 1 (see FIG. 1). This may for instance comprise sending information indicative of a use of an interfloor connector by a user of the mobile device 2 obtained at mobile device 2 to server 3. The communication may for instance be based on a (partly) wireless connection. The communication interface 23 may thus comprise circuitry such as modulators, filters, mixers, switches and/or one or more antennas to allow transmission and/or reception of signals, e.g. for the communication with server 3. In embodiments of the disclosure, communication interface 23 is inter alia configured to allow communication according to a 2G/3G/4G/5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile terminal 2) via a wire-bound system such as for instance the internet.

Processor 20 further controls a user interface 24 configured to present information to a user of mobile device 20 and/or to receive information from such a user, such as manually input position fixes. User interface 24 may for instance be the standard user interface via which a user of mobile device 2 controls other functionality thereof, such as making phone calls, browsing the Internet, etc.

Processor 20 may further control an optional GNSS interface 25 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case mobile device 2 has a GNSS interface 25, the user of mobile device 2 can still benefit from using positioning technologies based on other approaches, such as the approach described herein, since these technologies may provide a higher accuracy in particular with regard to position fixes, as positioning technologies based on the information indicative of a use of an interfloor connector work indoors, which is generally a challenging environment for GNSS-based technologies. Further advantageous may result in a reduced time-to-first-fix and/or a lower power consumption as compared to GNSS-based positioning.

In a preferred embodiment, the mobile device 2 further comprises a barometer 26. For this, processor 10 further controls the barometer 26 as an example for a pressure measurement instrument. The barometer 26 measures the ambient pressure at (or close to) the location of the mobile device. Thus, mobile device may automatically and/or repeatedly obtain pressure information. The barometer 26 may be used for obtaining information indicative of a use of an interfloor connector by the user of the mobile device, as explained with respect to FIG. 4.

The components 21-26 of mobile device 2 may for instance be connected with processor 20 by means of one or more serial and/or parallel busses.

Figure 1:
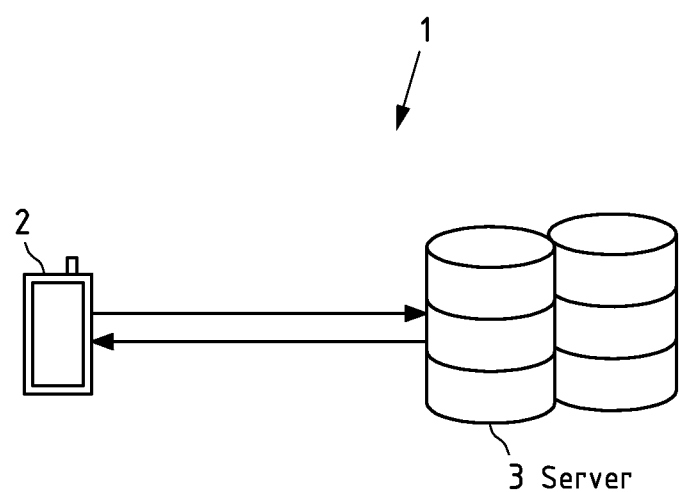
FIG. 1 is a block diagram of a system of a mobile device and a server.
Figure 3:
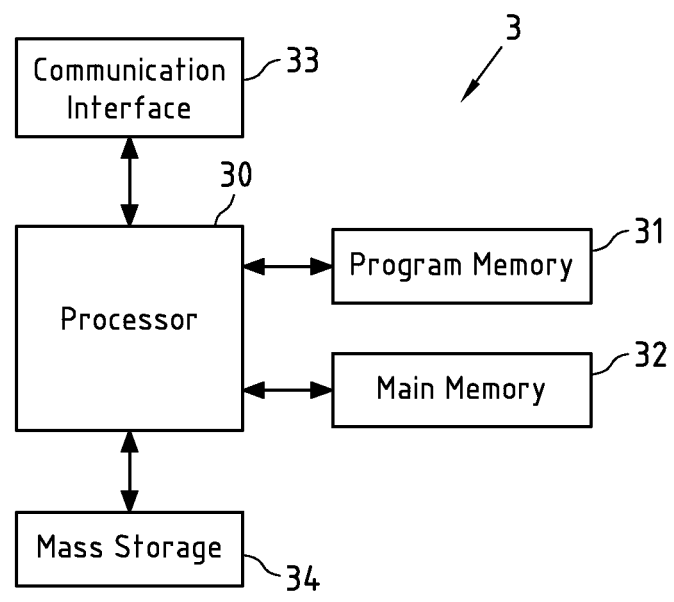
FIG. 3 is a block diagram of server of FIG. 1.

Turning now to FIG. 3, an exemplary block diagram of server 3 of FIG. 1 is shown. Similarly to FIG. 2, server 3 comprises a processor 30. Processor 30 may represent a single processor or two or more processors, which are for instance at least partially coupled, for instance via a bus. Processor 30 executes a program code stored in program memory 31 (for instance program code causing server 3 to perform embodiments of a method (or parts thereof) according to the first aspect of the disclosure (as for instance further described below with reference to FIG. 4), when executed on processor 30). Processor 30 further interfaces with a main memory 32 (for instance acting as a working memory) and a mass storage 34, which may for instance collect and store a plurality of fingerprints collected by mobile devices (such as mobile device 2). The fingerprints may comprise respective position estimations of respective mobile devices and associated measurements on radio signals, for instance. Mass storage 34 may in particular comprise radio map data and/or radio model data.

Processor 30 further controls a communication interface 33 configured to receive and/or output information. For instance, server 3 may be configured to communicate with mobile device 2 of system 1.

Figure 4:
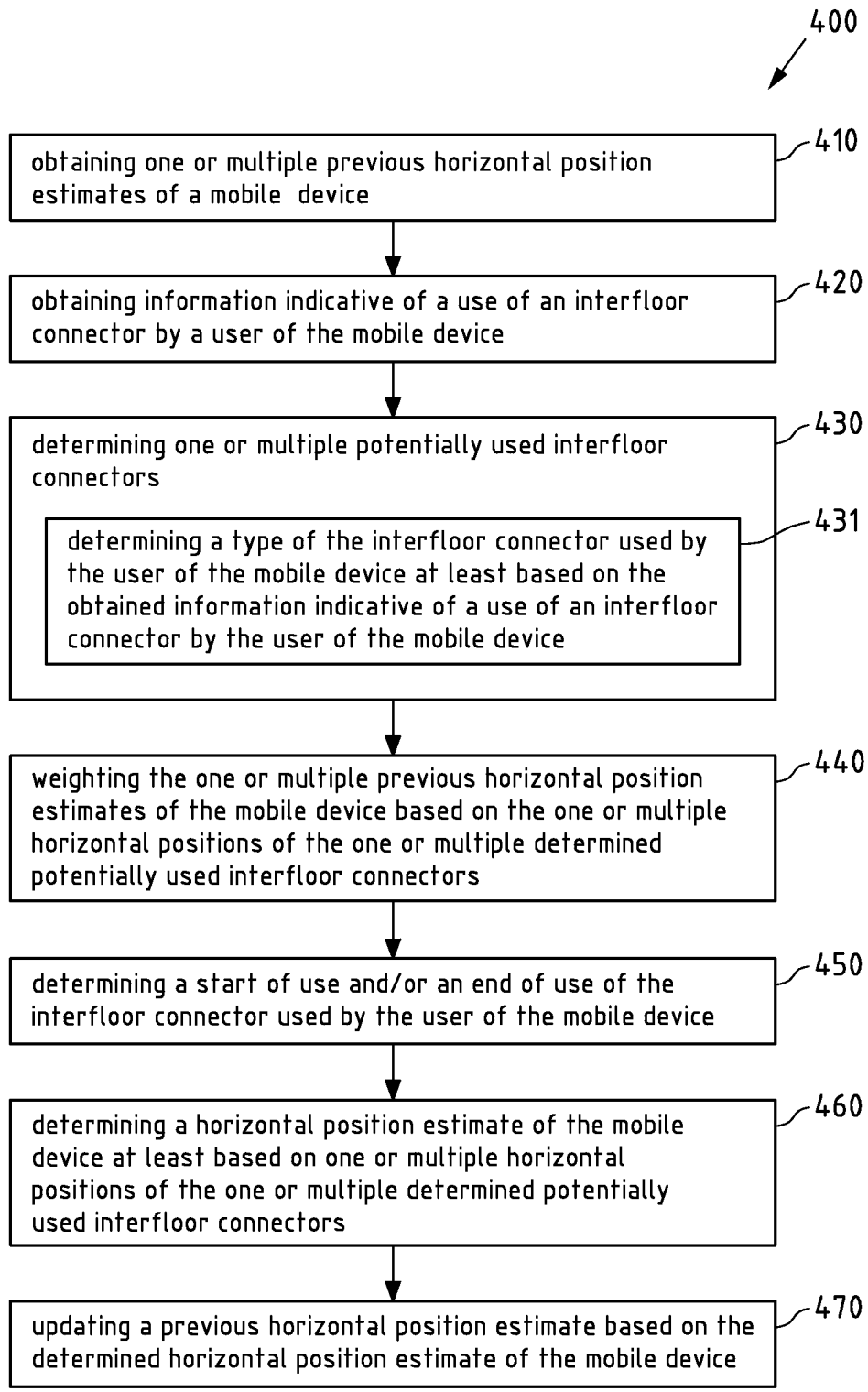
FIG. 4 is a flow chart illustrating an exemplary embodiment of a method according to the first aspect of the disclosure.
Figure 5:
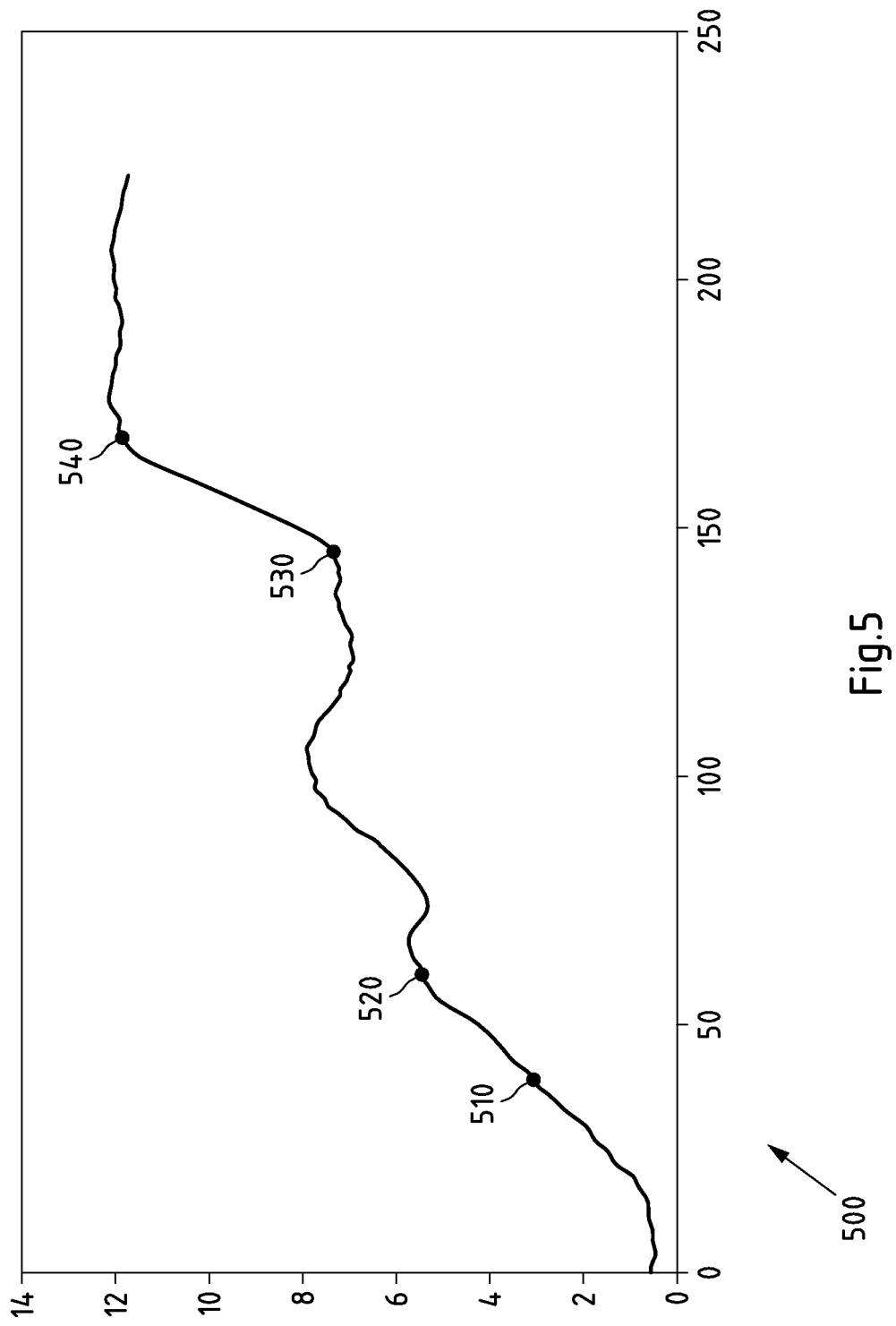
FIG. 5 is a diagram illustrating exemplary pressure information.
Figure 6A:
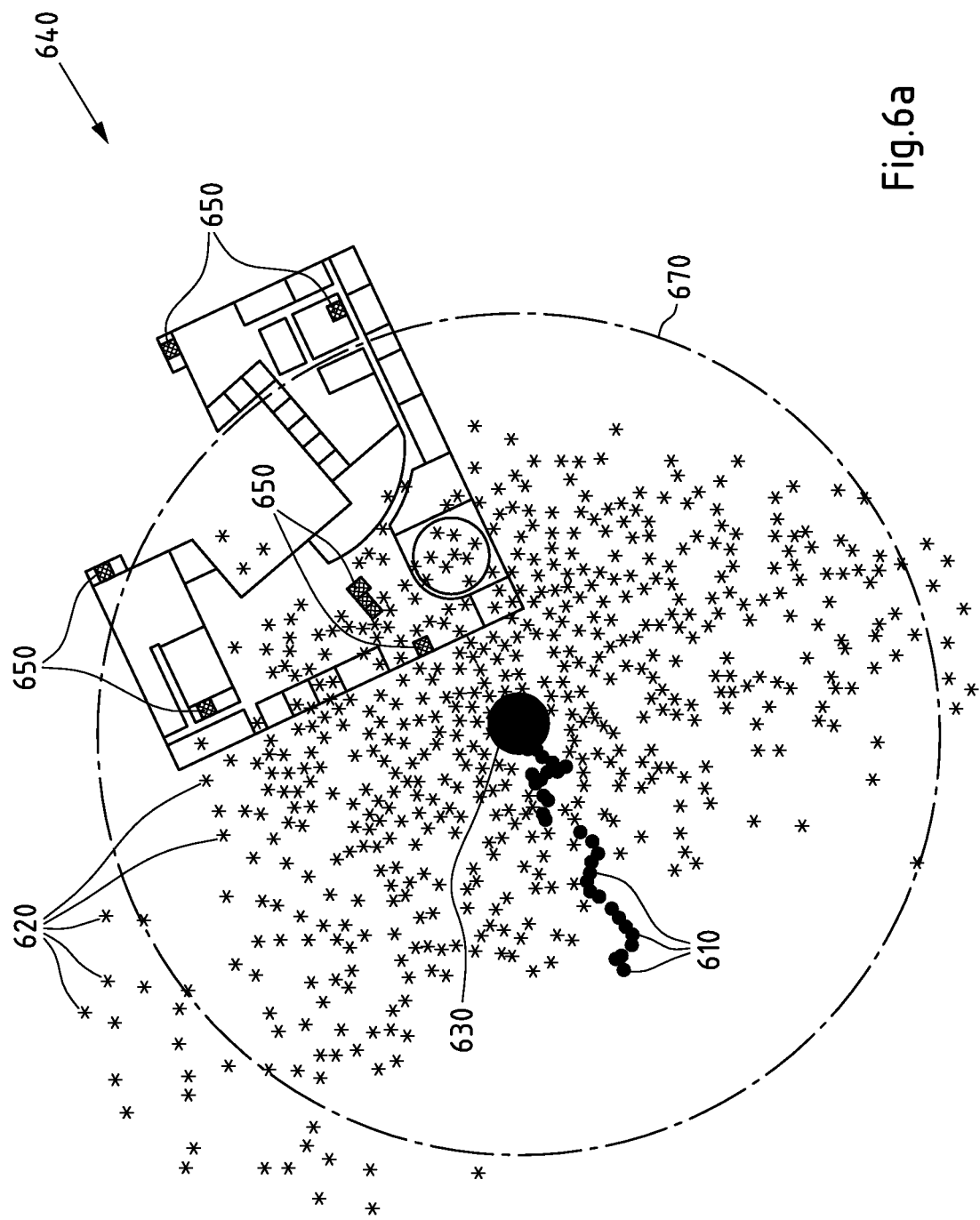
FIGS. 6a, b are diagrams illustrating an exemplary determination of a horizontal position of a mobile device.

FIG. 4 is now a flow chart 400 illustrating an exemplary embodiment of a method according to the first aspect of the disclosure, which will be described together with FIG. 5 showing a diagram illustrating exemplary pressure information and FIGS. 6a, b showing diagrams illustrating an exemplary determination of a horizontal position of a mobile device.

In the following example, the mobile device 2 will perform the actions 410-470. However, it may also be possible that some or all of the steps are performed by server 3, for instance.

The mobile device 2 obtains multiple previous and/or current horizontal position estimates 610, 620, 630 of said mobile device 2 (action 410). Such previous and/or current position estimates are illustrated in FIG. 6a. The previous and/or current horizontal position estimates 610 can be considered final previous and/or current position estimates, indicating the estimated horizontal position of the mobile device 2 for (past) different times. The multiple previous and/or current horizontal position estimates 620 can be considered intermittent previous and/or current horizontal position estimates for the same time. The intermittent previous and/or current horizontal position estimates 620 are weighted horizontal position estimates for the mobile device 2 for a certain time. The intermittent previous and/or current horizontal position estimates 620 are determined by a particle filter. The weighted average of the intermittent previous and/or current horizontal position estimates 620 results in the final previous and/or current horizontal position estimate 630, which is the most recent one.

The mobile device 2 obtains information indicative of a use of an interfloor connector by a user of a mobile device 2 (action 420). Such information is illustrated in diagram 500 of FIG. 5. The information is pressure information representative of the ambient atmospheric pressure (vertical axis) at said mobile device 2 and based on multiple pressure measurements at the mobile device 2 over time (horizontal axis). The information is indicative of an at least partially vertical movement of the mobile device 2. Therefore, the pressure information is indicative of a use of an interfloor connector by said user of said mobile device. This is because a fast change (e.g. above a threshold) of the altitude can be detected from the pressure measurements of the barometer 26. If a user uses an interfloor connector (e.g. walks up or down on the stairway or elevator), the pressure changes noticeably faster than when the user just walks on the floor or on the streets or other outdoor areas, not to mention staying in the same floor.

In diagram 500 of FIG. 5 an exemplary pressure change over an exemplary user track is presented. When the user goes at least one floor up or down, the pressure decreases or increase rapidly, and there is a considerable change of altitude (and thus pressure) equal to at least one floor height.

If it is determined that an interfloor connector has been used, the mobile device 2 determines one or multiple potentially used interfloor connectors (action 430). For this, it may be advantageous to determine a type of the interfloor connector used by the user of the mobile device 2 in particular based on the pressure information of FIG. 5 (action 431). At the mobile device 2, map data may be available, representing a map 640 of a site and also comprising information about the horizontal positions of interfloor connectors 650 at said site.

In one exemplary embodiment, a potentially used interfloor connector may be determined by selecting, from the available interfloor connectors 650, the interfloor connector closest to the previous and/or current horizontal position estimate 630, for example. In another exemplary embodiment multiple potentially used interfloor connectors are selected from interfloor connectors 650, e.g. all interfloor connectors within a certain radius (e.g. radius 670) from the previous and/or current horizontal position estimate 630.

In case of a single determined potentially used interfloor connector, a horizontal position estimate of the mobile device 2 can then be determined e.g. by setting it to the horizontal position of the potentially used interfloor connector. In case of multiple determined potentially used interfloor connectors, the horizontal position estimate of the mobile device 2 can then be determined e.g. by setting it to the (weighted) average of the horizontal positions of the multiple determined potentially used interfloor connectors.

Figure 6B:
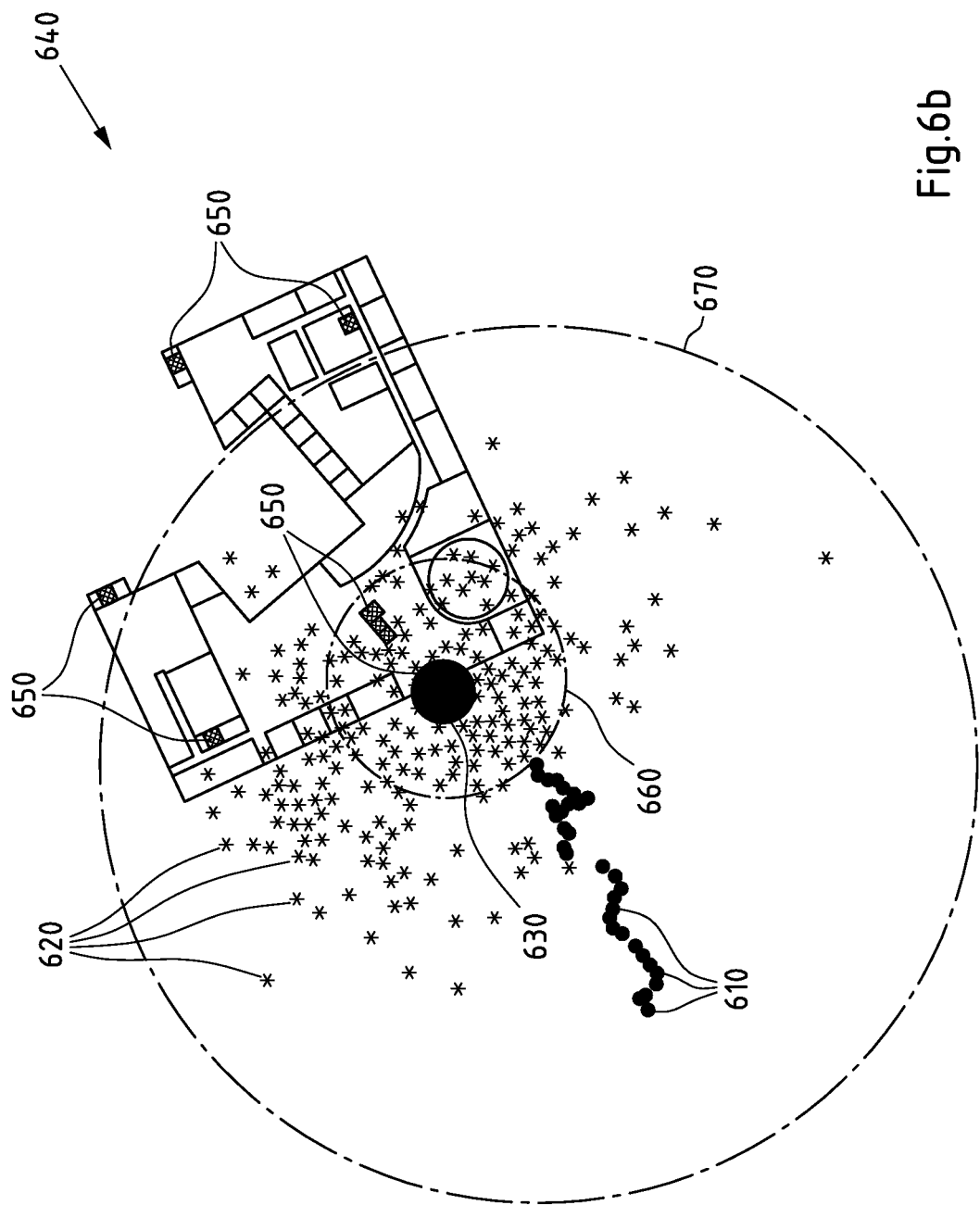

However, in the embodiment shown in FIG. 4 and FIG. 6, the multiple intermittent previous and/or current horizontal position estimates 620 of the mobile device 2 are first weighted based on the one or multiple horizontal positions of said one or multiple determined potentially used interfloor connectors (action 440). The closer a previous and/or current horizontal position estimate 620 is to the one or multiple potentially used interfloor connectors, the more weight is given to the previous and/or current horizontal position estimate 620. The result is illustrated in FIG. 6b. Only the intermittent previous and/or current horizontal position estimates 620' which have still a (substantial) weight (e.g. over a threshold) are shown. In particular, only the intermittent previous and/or current horizontal position estimates 620' inside the circle or ellipse 660 may have a reasonably large weight.

Additionally, in this example, the mobile device 2 determines a start of use and/or an end of use of the interfloor connector used by the user of the mobile device 2 (action 450). The moments, when the user enters and exits the respective interfloor connector can be detected based on the pressure measurements. The start and end times of a descend/ascend are detected as times of entering and exiting the interfloor connector. In FIG. 5, the dots 510, 520, 530, 540 indicate the detected start times (510, 530) and end times (520,540) of an ascend (in this case).

A horizontal position estimate 630' of the mobile device 2 can now be determined by determining a (weighted) average of the reweighted intermittent previous and/or current horizontal position estimates 620' (action 460). Therein, the horizontal position estimate of the mobile device 2 is determined for a time corresponding to the detected start of use and/or said end of use of the interfloor connector as described with respect to action 450. Further, the horizontal position estimate 630' is based on the one or multiple horizontal positions of the one or multiple determined potentially used interfloor connectors, as they influenced in particular the weighting (action 440).

Lastly, the more precise horizontal position estimate 630' of the mobile device 2 can now be used for updating the previous and/or current horizontal position estimate 630 (action 470).

Figure 7:
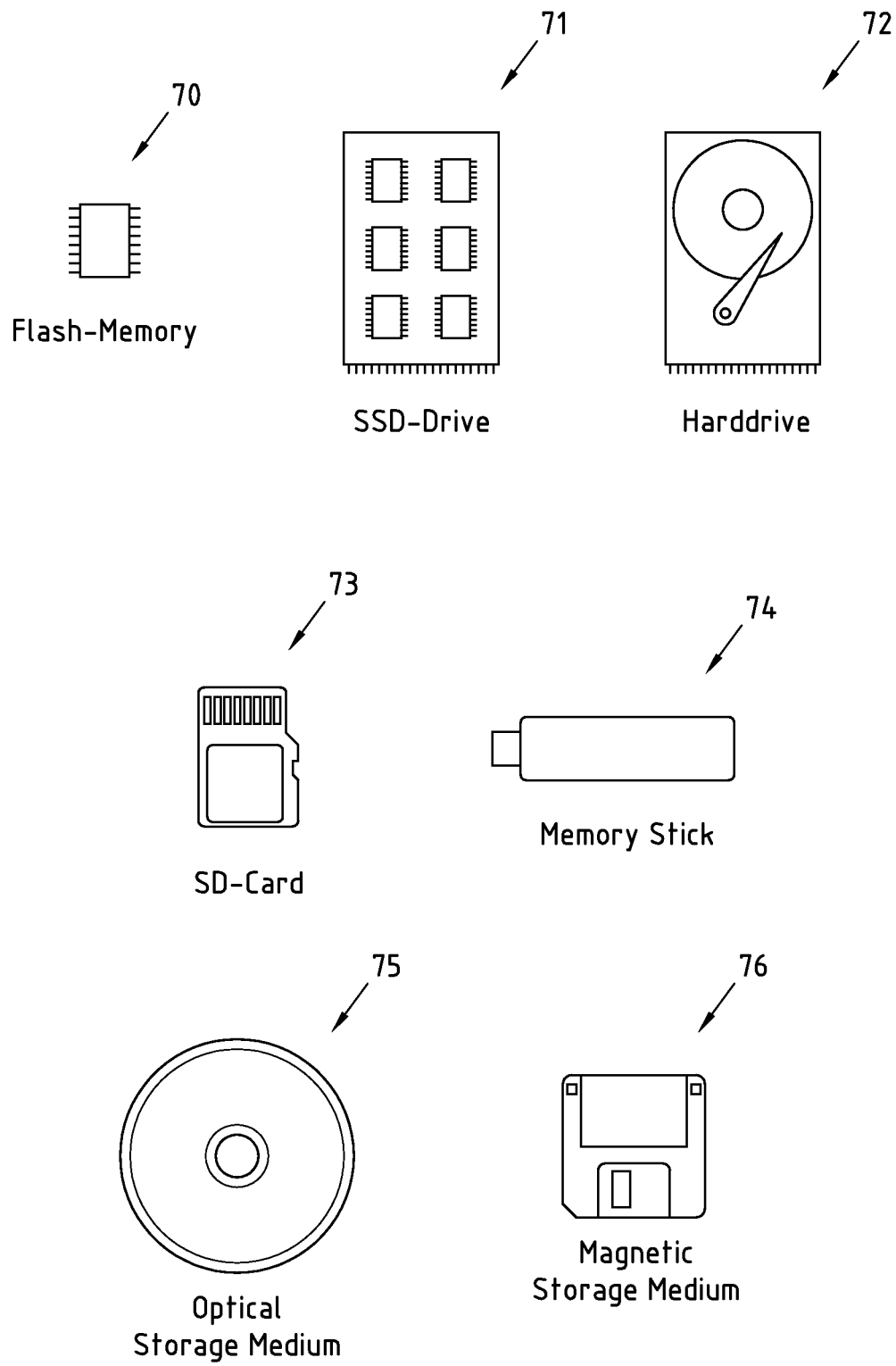
FIG. 7 is a schematic illustration of examples of tangible storage media according to the present disclosure.

FIG. 7 is a schematic illustration of examples of tangible storage media according to the present disclosure, that may for instance be used to implement program memory 21 of FIG. 2 and/or program memory 31 of FIG. 3. To this end, FIG. 7 displays a flash memory 70, which may for instance be soldered or bonded to a printed circuit board, a solid-state drive 71 comprising a plurality of memory chips (e.g. Flash memory chips), a magnetic hard drive 72, a Secure Digital (SD) card 73, a Universal Serial Bus (USB) memory stick 74, an optical storage medium 75 (such as for instance a CD-ROM or DVD) and a magnetic storage medium 76.

The following embodiments shall also be considered to be disclosed:

Embodiment 1

Method, performed by at least one apparatus, said method comprising:
  obtaining information indicative of a use of an interfloor connector by a user of a mobile device;
  determining one or multiple potentially used interfloor connectors;
  determining a horizontal position estimate of said mobile device at least based on one or multiple horizontal positions of said one or multiple determined potentially used interfloor connectors.

Embodiment 2

Method according to embodiment 1, wherein said information indicative of a use of an interfloor connector by said user of said mobile device is indicative of an at least partially vertical movement of said mobile device.

Embodiment 3

Method according to embodiment 1 or 2, wherein said information indicative of a use of an interfloor connector by said user of said mobile device is pressure information representative of pressure at said mobile device.

Embodiment 4

Method according to any of embodiments 1 to 3, wherein said pressure information representative of pressure at said mobile device is based on one or multiple pressure measurements at said mobile device.

Embodiment 5

Method according to any of embodiments 1 to 4, wherein said method further comprises:
  obtaining one or multiple previous and/or current horizontal position estimates of said mobile device.

Embodiment 6

Method according to any of embodiments 1 to 5, wherein multiple potentially used interfloor connectors are determined;
wherein said determining of a horizontal position estimate of said mobile device is at least based on respective multiple horizontal positions of said multiple determined potentially used interfloor connectors.

Embodiment 7

Method according to embodiment 5, wherein said determining of a horizontal position estimate of said mobile device comprises averaging said one or multiple previous and/or current horizontal position estimates and said one or multiple horizontal positions of said one or multiple determined potentially used interfloor connectors.

Embodiment 8

Method according to embodiment 5, wherein said one or multiple horizontal positions of said one or multiple determined potentially used interfloor connectors are weighted based on said one or multiple previous and/or current horizontal position estimates of said mobile device.

Embodiment 9

Method according to any of embodiments 5 to 8, wherein said determining of said one or multiple potentially used interfloor connectors is at least based on one or multiple previous and/or current horizontal position estimates of said mobile device.

Embodiment 10

Method according to any of embodiments 5 to 9, wherein said determining of said horizontal position estimate of said mobile device is further based on one or multiple previous and/or current horizontal position estimates of said mobile device.

Embodiment 11

Method according to any of embodiments 5 to 10, wherein said one or multiple previous and/or current horizontal position estimates of said mobile device are weighted based on said one or multiple horizontal positions of said one or multiple determined potentially used interfloor connectors.

Embodiment 12

Method according to any of embodiments 5 to 11, wherein said multiple previous and/or current horizontal position estimates of said mobile device are intermittent position estimates of said mobile device for the same time.

Embodiment 13

Method according to any of embodiments 1 to 12, wherein said determining of one or multiple potentially used interfloor connectors is at least based on said obtained information indicative of a use of an interfloor connector by said user of said mobile device.

Embodiment 14

Method according to any of embodiment 1 to 13, wherein said determining of one or multiple potentially used interfloor connector comprises determining a type of said interfloor connector used by said user of said mobile device at least based on said obtained information indicative of a use of an interfloor connector by said user of said mobile device.

Embodiment 15

Method according to any of embodiments 1 to 14, wherein said method further comprises:
determining a start of use and/or an end of use of said interfloor connector used by said user of said mobile device, wherein said horizontal position estimate of said mobile device is determined for a time corresponding to said start of use and/or said end of use.

Embodiment 16

Method according to any of embodiments 1 to 15, wherein said method further comprises:
updating a previous and/or current horizontal position estimate based on said determined horizontal position estimate of said mobile device.

Embodiment 17

The method according to any one of embodiments 1 to 16, wherein the at least one apparatus comprises one of
said mobile device; or
a component of said mobile device; or
a server; or
a component of a server.

Embodiment 18

A computer program code, the computer program code when executed by a processor causing an apparatus to perform the actions of the method of any one of embodiments 1 to 17.

Embodiment 19

A computer readable storage medium in which computer program code according to embodiment 18 is stored.

Embodiment 20

An apparatus configured to realize or comprising respective means for realizing the method according to any one of embodiments 1 to 17.

Embodiment 21

An apparatus comprising at least one processor and at least one memory including computer program code, the at least one memory and the computer program code configured to, with the at least one processor, cause an apparatus at least to perform the method according to any of embodiments 1 to 17.

Embodiment 22

The apparatus according to embodiment 20 or 21, wherein the apparatus is:

a module for a mobile device; or
a mobile device; or
a module for a server; or
a server.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 20 and 30 of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, performed by at least one apparatus, said method comprising:
  obtaining information indicative of a use of an interfloor connector by a user of a mobile device;
  obtaining one or multiple previous and/or current horizontal position estimates of said mobile device;
  determining multiple potentially used interfloor connectors within a predetermined radius of the one or multiple previous and/or current horizontal position estimates of said mobile device, corresponding to horizontal positions; and
  determining a horizontal position estimate of said mobile device at least based on an average of (i) one or multiple previous and/or current horizontal position estimates and (ii) the horizontal positions of said multiple determined potentially used interfloor connectors.

2. The method according to claim 1, wherein said information indicative of a use of an interfloor connector by said user of said mobile device is indicative of an at least partially vertical movement of said mobile device.

3. The method according to claim 1, wherein said information indicative of a use of an interfloor connector by said user of said mobile device is pressure information representative of pressure at said mobile device.

4. The method according to claim 1, wherein said horizontal positions of said multiple determined potentially used interfloor connectors are weighted based on said one or multiple previous and/or current horizontal position estimates of said mobile device.

5. The method according to claim 1, wherein said one or multiple previous and/or current horizontal position estimates of said mobile device are weighted based on said horizontal positions of said multiple determined potentially used interfloor connectors.

6. The method according to claim 1, wherein said one or multiple previous and/or current horizontal position estimates of said mobile device are intermittent position estimates of said mobile device for the same time.

7. The method according to claim 1, wherein said determining of multiple potentially used interfloor connector comprises determining a type of said interfloor connector used by said user of said mobile device at least based on said obtained information indicative of a use of an interfloor connector by said user of said mobile device.

8. The method according to claim 1, wherein said method further comprises:
  determining a start of use and/or an end of use of said interfloor connector used by said user of said mobile device, wherein said horizontal position estimate of said mobile device is determined for a time corresponding to said start of use and/or said end of use.

9. The method according to claim 1, wherein said method further comprises:
  updating a previous and/or current horizontal position estimate based on said determined horizontal position estimate of said mobile device.

10. A non-transitory computer readable medium including instructions, the instructions when executed by a processor causing an apparatus to perform the actions of a method, said method comprising:
  obtaining information indicative of a use of an interfloor connector by a user of a mobile device;
  identifying a previous position estimate of the mobile device;
  determining multiple potentially used interfloor connectors within a predetermined distance of the previous position estimate of the mobile device; and
  determining a horizontal position estimate of said mobile device at least based on an average of (i) the previous position estimate of the mobile device and (ii) multiple horizontal positions of said multiple determined potentially used interfloor connectors.

11. An apparatus comprising at least one processor and at least one memory including computer program code, the at least one memory and the computer program code configured to, with the at least one processor, cause an apparatus at least to perform a method, said method comprising:
   obtaining information indicative of a use of an interfloor connector by a user of a mobile device;
   obtaining one or multiple previous and/or current horizontal position estimates of said mobile device;
   determining multiple potentially used interfloor connectors within a predetermined distance of the one or multiple previous and/or current horizontal position estimates of said mobile device; and
   calculating a horizontal position estimate of said mobile device at least based on an average of (i) the one or multiple previous and/or current horizontal position estimates of said mobile device and (ii) horizontal positions of said multiple determined potentially used interfloor connectors.

12. The apparatus according to claim 11, wherein said information indicative of a use of an interfloor connector by said user of said mobile device is indicative of an at least partially vertical movement of said mobile device.

13. The apparatus according to claim 11, wherein said information indicative of a use of an interfloor connector by said user of said mobile device is pressure information representative of pressure at said mobile device.

14. The apparatus according to claim 11, wherein said horizontal positions of said multiple determined potentially used interfloor connectors are weighted based on said one or multiple previous and/or current horizontal position estimates of said mobile device.

15. The apparatus according to claim 11, wherein said one or multiple previous and/or current horizontal position estimates of said mobile device are weighted based on said horizontal positions of said multiple determined potentially used interfloor connectors.

16. The apparatus according to claim 11, wherein said one or multiple previous and/or current horizontal position estimates of said mobile device are intermittent position estimates of said mobile device for the same time.

17. The apparatus according to claim 11, wherein said determining of multiple potentially used interfloor connector comprises determining a type of said interfloor connector used by said user of said mobile device at least based on said obtained information indicative of a use of an interfloor connector by said user of said mobile device.

18. The apparatus according to claim 11, wherein said method further comprises:
   determining a start of use and/or an end of use of said interfloor connector used by said user of said mobile device, wherein said horizontal position estimate of said mobile device is determined for a time corresponding to said start of use and/or said end of use.

19. The apparatus according to claim 11, wherein said method further comprises:
   updating a previous and/or current horizontal position estimate based on said determined horizontal position estimate of said mobile device.

20. The apparatus according to claim 11, wherein the apparatus is:
   a module for a mobile device; or
   a mobile device; or
   a module for a server; or
   a server.

* * * * *